United States Patent
Doerner et al.

(10) Patent No.: US 6,863,993 B1
(45) Date of Patent: *Mar. 8, 2005

(54) THIN FILM MEDIA WITH A DUAL SEED LAYER OF RUAI/NIAIB

(75) Inventors: Mary Frances Doerner, Santa Cruz, CA (US); Kai Tang, San Jose, CA (US); Qi-Fan Xiao, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/676,735

(22) Filed: Sep. 30, 2003

(51) Int. Cl.⁷ .............................. G11B 5/66; G11B 5/70; H01J 1/00
(52) U.S. Cl. ................. 428/611; 428/668; 428/694 TS; 428/694 TM
(58) Field of Search .................... 428/694 TS, 694 TM, 428/694 SG, 611, 668

(56) References Cited

U.S. PATENT DOCUMENTS

| | | | |
|---|---|---|---|
| 5,789,056 A | 8/1998 | Bin et al. | |
| 5,800,931 A | 9/1998 | Lee et al. | |
| 6,159,625 A | * 12/2000 | Ueno | 428/694 T |
| 6,740,397 B1 | * 5/2004 | Lee | 428/332 |
| 6,753,101 B1 | * 6/2004 | Abarra et al. | 428/694 TM |
| 2001/0024742 A1 | 9/2001 | Bian et al. | |
| 2003/0203244 A1 | 10/2003 | Hideki et al. | |

* cited by examiner

Primary Examiner—Holly Rickman
(74) Attorney, Agent, or Firm—G. Marlin Knight

(57) ABSTRACT

A thin film structure for a magnetic thin film recording medium including a dual seed layer of RuAl/NiAlB is disclosed. The use of the RuAl/NiAlB structure provides reduced grain size, an increased Mrt orientation ratio (OR), increased SNR and lower PW50 at higher amplitude. The RuAl and NiAlB seed layers each have a B2 crystallographic structure. The RuAl/NiAlB dual seed layer can be used to obtain an underlayer with a preferred in-plane orientation of (200) and a cobalt alloy magnetic film with the preferred in-plane orientation of (11 20).

19 Claims, 1 Drawing Sheet

THIN FILM MEDIA WITH A DUAL SEED LAYER OF RUAI/NIAIB

FIELD OF THE INVENTION

The invention relates to magnetic thin film media and methods for their fabrication and more particularly to magnetic thin film disks having a seed layer structure prior to an underlayer.

BACKGROUND OF THE INVENTION

A typical prior art disk drive system 10 is illustrated in FIG. 1. In operation the magnetic transducer 20 is supported by the suspension 13 as it flies above the disk 16. The magnetic transducer 20, usually called a "head" or "slider," is composed of elements that perform the task of writing magnetic transitions (the write head 23) and reading the magnetic transitions (the read head 12). The electrical signals to and from the read and write heads 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded.

The conventional disk 16 consists of substrate 26 of AlMg with an electroless coating of NiP which has been highly polished. Glass is also commonly used for the substrate 26. The thin films 21 on the disk 16 typically include a chromium or chromium alloy underlayer which is deposited on the substrate 26. The ferromagnetic layer in the thin films is based on various alloys of cobalt, nickel and iron. For example, a commonly used alloy is CoPtCr. Additional elements such as tantalum and boron are often used in the magnetic alloy. A protective overcoat layer is used to improve wearability and corrosion. The three film disk described above does not exhaust the possibilities. Various seed layers, multiple underlayers and laminated magnetic films have all been described in the prior art.

In particular, seed layers have been suggested for use with nonmetallic substrate materials such as glass. Typically the seed layer is a relatively thin layer which is the initial film deposited on the substrate and is followed by the underlayer. Materials proposed for use as seed layers include chromium, titanium, tantalum, Ni3P, MgO, carbon, tungsten, AlN, FeAl, RuAl and NiAl. In U.S. Pat. No. 5,789,056 to Bian, et al., the use of a CrTi seed layer is described. The underlayers mentioned are Cr, CrV and CrTi.

In U.S. Pat. No. 6,010,795 to Chen, et al. a magnetic recording medium is described which has a surface oxidized seed layer (such as NiP), a Cr-containing sub-underlayer, a NiAl or FeAl underlayer and a Cr-containing intermediate layer on the NiAl or FeAl underlayer. The underlayer is said to have a (200) crystallographic orientation.

A MgO seed layer is disclosed in U.S. Pat. No. 5,800,931 to Lee, et al. A B2 structure underlayer, preferably NiAl or FeAl., is used along with an optional thin Cr or Cr alloy intermediate layer between the underlayer and the magnetic layer.

In published U.S. application 20010024742, Bian, et al. described a RuAl seed layer deposited directly onto a pre-seed layer and an optional layer of NiAl following the RuAl. This double layer configuration could result in cost savings by reducing the amount of Ru required to form the seed layer. Ru is an expensive element so a reduction in the required quantity of Ru reduces the costs. In the double layer structure the RuAl seed layer establishes the grain size and orientation and the subsequently deposited NiAl follows the established patterns.

Continued improvement in the magnetic recording properties is needed to further increase the areal recording density for magnetic media.

SUMMARY OF THE INVENTION

The applicants disclose a magnetic thin film recording medium including a dual seed layer of RuAl/NiAlB. The use of the RuAl/NiAlB structure provides reduced grain size, increased Mrt orientation ratio (OR), increased SNR and lower PW50 at higher amplitude. The RuAl and NiAlB seed layers each have a B2 crystallographic structure. The RuAl/NiAlB dual seed layer can be used to obtain an underlayer with a preferred in-plane orientation of (200) and a cobalt alloy magnetic film with the preferred in-plane orientation of (1120).

DETAILED DESCRIPTION OF THE INVENTION AND THE PREFERRED EMBODIMENTS

Figure 1:
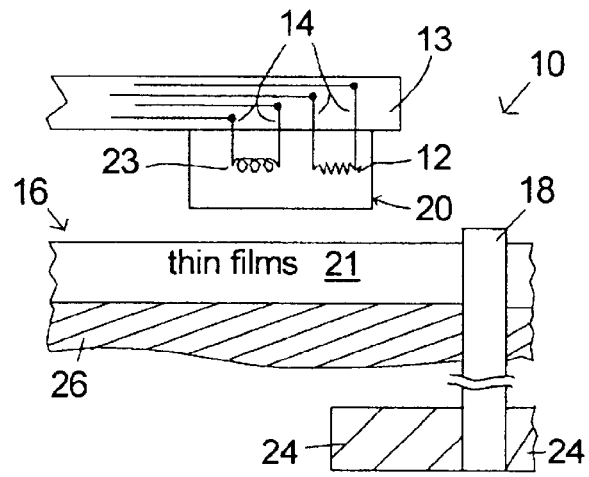
FIG. 1 is a symbolic illustration of the prior art showing the relationships between the head and associated components in a disk drive.
Figure 2:
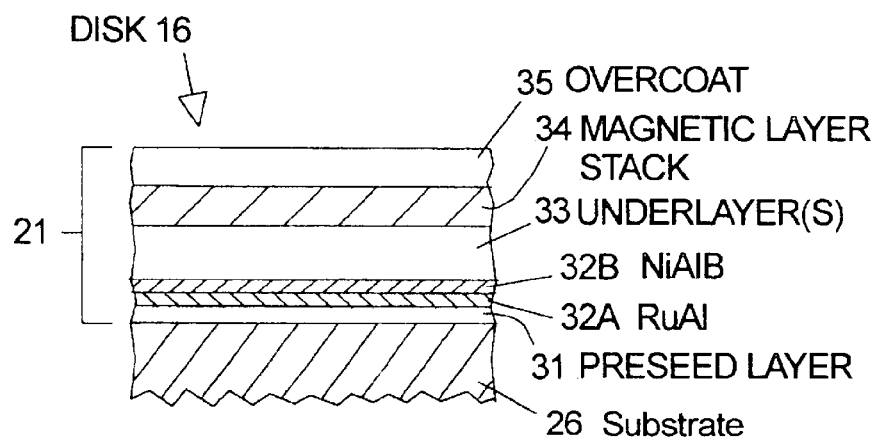
FIG. 2 is an illustration of a preferred embodiment layer structure for a magnetic thin film disk according to the invention.

Reference is made to FIG. 2 to illustrate the thin film layers in a preferred embodiment of a magnetic film disk 16 including the dual seed layer of the invention. The dual seed layer of the invention is preferably used with a pre-seed layer. The pre-seed layer is sputter deposited directly onto the substrate surface 26 which may be glass or any other appropriate material or surface. The preferred pre-seed layer 31 is an amorphous or nanocrystalline layer of CrTi alloy, with $CrTi_{50}$ being even more preferred. Amorphous or nanocrystalline AlTa, CrTa or AlTi can also be considered as preferred materials for use as a pre-seed layer 31. The use of a pre-seed layer of CrTi, CrTa, AlTa or AlTi improves grain size, grain distribution, in-plane crystallographic orientation, coercivity and SNR.

The dual seed layer of the invention includes a crystalline layer of RuAl 32A followed by a crystalline layer of NiAlB 32B. The RuAl layer grows as a B2 crystallographic structure on the amorphous pre-seed layer. The NiAlB epitaxially follows as a B2 crystallographic structure. The addition of boron to NiAl reduces the grain size of the NiAlB layer and this reduced grain can be maintained through the subsequent crystalline layers. The preferred composition includes from 2 to 5 at. % boron, with nickel and aluminum being approximately equal, but several atomic percentage points difference between the nickel and aluminum are acceptable. An even more preferred composition is $NiAl_{48}B_2$. RuAl tends to be more expensive than NiAlB, so one advantage of the bi-layer is that the RuAl layer can be kept very thin saving on the high cost of RuAl.

One or more underlayers 33 follow the NiAlB layer 32B. Underlayers are commonly chromium alloys. The preferred underlayer is CrTi and even more preferred is an underlayer of $CrTi_{20}$. The chromium based underlayer 33 can also be kept very thin when CrTi is used.

It is known that the cobalt alloy magnetic films may be grown with the in-plane preferred orientations of (1010) or (1120) by first depositing an underlayer with a (112) or (200) preferred orientations respectively. The RuAl seed layer with a B2 crystallographic structure has been used alone to obtain an underlayer with a preferred in-plane orientation of (200) and a cobalt alloy magnetic film with the preferred in-plane orientation of (1120). The addition of the NiAlB does not change this epitaxy when used following RuAl. However, NiAlB used without RuAl will tend to produce a (1010) which is undesirable for media with a target orientation ratio greater one. The preferred embodiment disk structure uses a circumferentially textured substrate and has an orientation ratio greater than one.

FIG. 2 shows a magnetic layer stack 34 following the underlayer 33. A protective overcoat 35 is the final layer. The magnetic layer stack 34 can include any of a large variety of single or multiple layers at least one of which must be ferromagnetic. Examples of commonly used ferromagnetic alloys are CoPtCr, CoPtCrTa and CoPtCrB. Laminated magnetic layers and antiferromagnetically coupled magnetic layers can be used along with the seed bi-layer of the invention. An onset layer can also be used. The preferred embodiment uses a magnetic layer stack 34 of CoCr/spacer/CoPtCrB. An even more preferred embodiment uses a magnetic layer stack 34 of $CoCr_{10}/Ru/CoPt_{12}Cr_{18}B_8$.

Experimental data on the magnetic performance for selected experimental disks is presented in table 1. The preferred $NiAl_{48}B_2$ alloy and the most preferred materials and compositions given above were used for the other layers. Disk 3 used RuAl with no other seed layer to show the benefit of adding the NiAlB layer.

TABLE 1

| Disk | RuAl thickness (nm) | NiAlB thickness (nm) | Mrt OR | DC SNR (dB) | SNR @310KBPI (Db) | PW50 (nm) | LFTAA (mv) |
|---|---|---|---|---|---|---|---|
| 1 | 5.7 | 8.6 | 1.43 | 33.9 | 29.3 | 101.5 | 1.193 |
| 2 | 8.6 | 5.7 | 1.39 | 34.1 | 29.3 | 101.3 | 1.186 |
| 3 | 17.2 | 0 | 1.27 | 33.7 | 29.1 | 101.9 | 1.162 |

The disks with the RuAl/NiAlB seed bi-layer of the invention had significantly higher Mrt OR than did the RuAl disk. The SNR is increased and PW50 is lower at higher amplitude.

The total thickness of the seed bi-layer only needs to be sufficient to establish good crystallographic orientation. The upper limit on the thickness will be determined by the tendency of the grain size to increase with thickness. The NiAlB layer can be thicker than the RuAl. Table 2 shows the Mrt orientation ratio (OR) for four different thicknesses of RuAl used with a constant NiAlB layer of 8.6 nm. Mrt OR increases slightly with decrease of RuAl thickness.

TABLE 2

| RuAl thickness (nm) | Mrt OR |
|---|---|
| 1.7 | 1.45 |
| 2.3 | 1.46 |
| 4.8 | 1.43 |
| 8.3 | 1.40 |

The atomic percent compositions given above are given without regard for the small amounts of contamination that invariably exist in thin films as is well known to those skilled in the art. The invention has been described with respect to particular embodiments, but other uses and applications for the bilayer structure comprising a RuAl/NiAlB will be apparent to those skilled in the art.

What is claimed is:

1. A magnetic thin film layer structure comprising:
   a layer of RuAl;
   a layer of NiAlB epitaxially deposited on the layer of RuAl; and
   a ferromagnetic layer structure deposited after the layer of NiAlB.

2. The magnetic thin film layer structure of claim 1 wherein the NiAlB has approximately from 2 to 5 atomic percent boron with the remainder being generally divided between nickel and aluminum.

3. The magnetic thin film layer structure of claim 2 wherein NiAlB has approximately 50 atomic percent nickel, 48 atomic percent aluminum and 2 atomic percent boron.

4. The magnetic thin film layer structure of claim 1 further comprising a substrate and a pre-seed layer of CrTi deposited on the substrate prior to the layer of RuAl.

5. The magnetic thin film layer structure of claim 4 wherein the substrate is circumferentially textured glass.

6. The magnetic thin film layer structure of claim 1 further comprising an underlayer of CrTi deposited on the layer of NiAlB.

7. The magnetic thin film layer structure of claim 1 wherein the ferromagnetic layer structure further comprises a magnetic layer stack including a layer of CoCr and a layer of CoPtCrB separated by a spacer layer.

8. The magnetic thin film layer structure of claim 7 wherein the spacer layer is ruthenium.

9. A magnetic thin film disk comprising:
   an amorphous or nanocrystalline pre-seed layer;
   a seed layer of RuAl with a B2 crystallographic structure deposited on the pre-seed layer;
   a seed layer of NiAlB with a B2 crystallographic structure deposited on the layer of RuAl, the NiAlB having approximately from 2 to 5 atomic percent boron with the remainder being generally divided between nickel and aluminum; and
   a ferromagnetic layer structure above the layer of NiAlB.

10. The magnetic thin film disk of claim 9 wherein the seed layer of NiAlB has approximately 2 at. % boron.

11. The magnetic thin film disk of claim 9 further comprising a substrate and wherein the pre-seed layer is CrTi deposited on the substrate.

12. The magnetic thin film disk of claim 9 further comprising an underlayer of CrTi deposited on the layer of NiAlB prior to the ferromagnetic layer structure.

13. The magnetic thin film disk of claim 9 wherein the ferromagnetic layer structure includes is CoPtCrB and is preceded by a spacer layer and a layer of CoCr forming a magnetic layer stack.

14. A magnetic disk drive comprising:
   a magnetic transducer including a read head and a write head;
   a suspension supporting the magnetic transducer over a magnetic disk; and
   the magnetic disk including a dual seed layer comprising a layer RuAl followed by a layer of NiAlB epitaxially deposited onto the layer of RuAl.

15. The magnetic disk drive of claim 14 wherein the layer of NiAlB has approximately from 2 to 5 atomic percent boron with the remainder being generally divided between nickel and aluminum.

16. The magnetic disk drive of claim 15 wherein the layer of NiAlB has approximately 50 atomic percent nickel, 48 atomic percent aluminum and 2 atomic percent boron.

17. The magnetic disk drive of claim 14 wherein the magnetic disk further comprises a circumferentially textured substrate and the magnetic disk has an Mrt orientation ratio greater than one.

18. The magnetic disk drive of claim 14 wherein the magnetic disk further comprises an underlayer of CrTi deposited on the layer of NiAlB.

19. The magnetic disk drive of claim 14 wherein the magnetic disk further comprises a magnetic layer stack deposited after the layer of NiAlB including a layer of CoCr and a layer CoPtCrB separated by a spacer layer.

* * * * *